(12) United States Patent
Kosaka

(10) Patent No.: US 11,559,769 B2
(45) Date of Patent: Jan. 24, 2023

(54) NANOCARBON SEPARATION DEVICE AND NANOCARBON SEPARATION METHOD

(71) Applicant: NEC CORPORATION, Tokyo (JP)

(72) Inventor: Mayumi Kosaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 370 days.

(21) Appl. No.: 16/754,642

(22) PCT Filed: Oct. 3, 2018

(86) PCT No.: PCT/JP2018/037060
§ 371 (c)(1),
(2) Date: Apr. 8, 2020

(87) PCT Pub. No.: WO2019/073882
PCT Pub. Date: Apr. 18, 2019

(65) Prior Publication Data
US 2020/0261848 A1 Aug. 20, 2020

(30) Foreign Application Priority Data
Oct. 10, 2017 (JP) .............................. JP2017-197275

(51) Int. Cl.
*B01D 57/02* (2006.01)
*C01B 32/172* (2017.01)
(Continued)

(52) U.S. Cl.
CPC ............ *B01D 57/02* (2013.01); *C01B 32/172* (2017.08); *C01B 32/174* (2017.08); *B82Y 30/00* (2013.01); *B82Y 40/00* (2013.01)

(58) Field of Classification Search
CPC .. B01D 57/02; B03C 5/00; B03C 5/02; C01B 32/15; C01B 32/172; C01B 2202/22
(Continued)

(56) References Cited

U.S. PATENT DOCUMENTS

2010/0189626 A1* 7/2010 Tanaka .................. B82Y 10/00
423/447.2

FOREIGN PATENT DOCUMENTS

| JP | 2008-55375 A | 3/2008 |
|---|---|---|
| JP | 2009-286663 A | 12/2009 |

(Continued)

OTHER PUBLICATIONS

International Search Report for PCT/JP2018/037060 dated Nov. 13, 2018 [PCT/ISA/210].

*Primary Examiner* — Tri V Nguyen
(74) *Attorney, Agent, or Firm* — Sughrue Mion, PLLC

(57) ABSTRACT

A nanocarbon separation device includes a first porous structure configured to hold a solution containing a surfactant, a second porous structure configured to hold a dispersion medium, a holding part provided between the first porous structure and the second porous structure and configured to hold the dispersion liquid containing the nanocarbons and the surfactant and having a smaller content of the surfactant than that of the solution, a separation tank in which the first porous structure, the holding part and the second porous structure are disposed and accommodated in an order of the first porous structure, the holding part and the second porous structure, a first electrode provided on a lower section of the first porous structure, and a second electrode provided on an upper section of the second porous structure.

12 Claims, 11 Drawing Sheets

(51) Int. Cl.
*C01B 32/174* (2017.01)
*B82Y 40/00* (2011.01)
*B82Y 30/00* (2011.01)

(58) Field of Classification Search
USPC .............................. 204/450; 423/461, 445 R
See application file for complete search history.

(56) References Cited

FOREIGN PATENT DOCUMENTS

| | | |
|---|---|---|
| JP | 5541283 B2 | 7/2014 |
| JP | 5717233 B2 | 5/2015 |
| WO | 2008/143281 A1 | 11/2008 |
| WO | 2010/150808 A1 | 12/2010 |
| WO | 2011/102322 A1 | 8/2011 |

* cited by examiner

NANOCARBON SEPARATION DEVICE AND NANOCARBON SEPARATION METHOD

CROSS REFERENCE TO RELATED APPLICATIONS

This application is a National Stage of International Application No. PCT/JP2018/037060 filed Oct. 3, 2018, claiming priority based on Japanese Patent Application No. 2017-197275, filed Oct. 10, 2017, the content of which is incorporated herein by reference.

TECHNICAL FIELD

The present invention relates to a nanocarbon separation device and a nanocarbon separation method.

BACKGROUND ART

Since single-walled carbon nanotubes have a high electron mobility, it is thus expected that they will have applications in various fields due to the mechanical properties, electrical properties, chemical properties, and the like, thereof. Since single-walled carbon nanotubes are synthesized as mixtures containing materials having different properties such as semiconductor and metallic properties in which the materials are mixed at a ratio of 2:1, they need to be separated quickly and with a high purity for industrial applications.

As a method of separating a mixture of single-walled carbon nanotubes, for example, a nanocarbon material separation method including an introduction/configuring process and a separating process is known (for example, see Patent Literature 1). In the introduction/configuring process, a dispersion solution of a nanocarbon material and a holding solution having a specific gravity different from that of the nanocarbon material, which are distributed in nanocarbon micelle groups having a plurality of different charges, are laminated in an electrophoretic tank in a predetermined direction and introduced and disposed. In the separating process, the nanocarbon micelle groups are separated into two or more nanocarbon micelle groups by applying a direct current voltage to the dispersion solution and the holding solution, which are laminated, introduced, and disposed, in a serial direction. In addition, there is a single-walled carbon nanotube separation method including a process of applying a direct current voltage to a single-walled carbon nanotube-containing micelle dispersion solution in which single-walled carbon nanotubes are distributed in a nonionic surfactant solution in a separation tank installed as a vertical type, and separating the solution into at least two layers including a single-walled carbon nanotube-containing micelle dispersion liquid layer and a semiconducting single-walled carbon nanotube-containing micelle dispersion liquid layer.

The single-walled carbon nanotube-containing micelle dispersion liquid layer is an enriched layer of metallic single-walled carbon nanotubes, in which micelles have positive charges as a whole.

The semiconducting single-walled carbon nanotube-containing micelle dispersion liquid layer is a layer in which micelles have extremely weak charges only as a whole. In the single-walled carbon nanotube separation method, a method of applying a direct current voltage using a negative electrode installed in an upper section of a separation tank and a positive electrode installed in a lower section and directing an orientation of an electric field upward parallel to the direction of gravity is known (for example, see Patent Literature 2).

CITATION LIST

Patent Literature

[Patent Literature 1]
  Japanese Patent No. 5541283
[Patent Literature 2]
  Japanese Patent No. 5717233

SUMMARY OF INVENTION

Problem to be Solved by the Invention

However, in the separation method disclosed in Patent Literature 1 and 2, there is a need to form three layers formed of nanocarbon dispersion liquids having different surfactant concentrations in an electrophoretic tank before application of a voltage. In addition, the nanocarbon dispersion liquids have to be injected into the electrophoretic tank very slowly such that the nanocarbon dispersion liquids having different surfactant concentrations are not mixed.

The present invention is directed to providing a nanocarbon separation device and a nanocarbon separation method that efficiently form layers formed of nanocarbon dispersion liquids having different surfactant concentrations in an electrophoretic tank in separation of nanocarbons having different properties.

Means for Solving the Problem

A nanocarbon separation device of the present invention includes a first porous structure configured to hold a solution containing a surfactant; a second porous structure configured to hold a dispersion medium; a holding part provided between the first porous structure and the second porous structure and configured to hold the dispersion liquid containing the nanocarbons and the surfactant and having a smaller content of the surfactant than that of the solution; a separation tank in which the first porous structure, the holding part and the second porous structure are disposed in an order of the first porous structure, the holding part and the second porous structure; a first electrode provided on a lower section of the first porous structure; and a second electrode provided on an upper section of the second porous structure.

A nanocarbon separation method of the present invention includes a process of disposing a first porous structure in which a solution containing a surfactant is held, a holding part in which a dispersion liquid containing nanocarbons and the surfactant and having a smaller content of the surfactant than that of the solution is held, and a second porous structure in which the dispersion medium is held, in an order of the first porous structure, the holding part and the second porous structure; a process of bringing a first electrode into contact with at least a lower section of the first porous structure and bringing a second electrode into contact with at least an upper section of the second porous structure; and a process of applying a direct current voltage between the first electrode and the second electrode.

A nanocarbon separation method of the present invention includes a process of disposing a first porous structure in which a solution containing a surfactant is held, a holding part in which a dispersion liquid containing nanocarbons and the surfactant and having a smaller content of the surfactant than that of the solution is held, and a second porous structure in which the dispersion medium is held, in an order of the first porous structure, the holding part and the second porous structure; a process of bringing a first electrode into contact with a lower section of the first porous structure and bringing a second electrode into contact with an upper section of the second porous structure; a process of holding the dispersion liquid in the holding part; and a process of applying a direct current voltage between the first electrode and the second electrode.

Advantageous Effects of Invention

According to the present invention, layers formed of nanocarbon dispersion liquids having different surfactant concentrations are efficiently formed in an electrophoretic tank.

DESCRIPTION OF EMBODIMENTS

Embodiments of a nanocarbon separation device and a nanocarbon separation method of the present invention will be described.

Further, the embodiments are specifically described for better understanding of the spirit of the invention and do not limit the present invention unless the context clearly indicates otherwise.

First Embodiment (Nanocarbon Separation Device)

Figure 1:
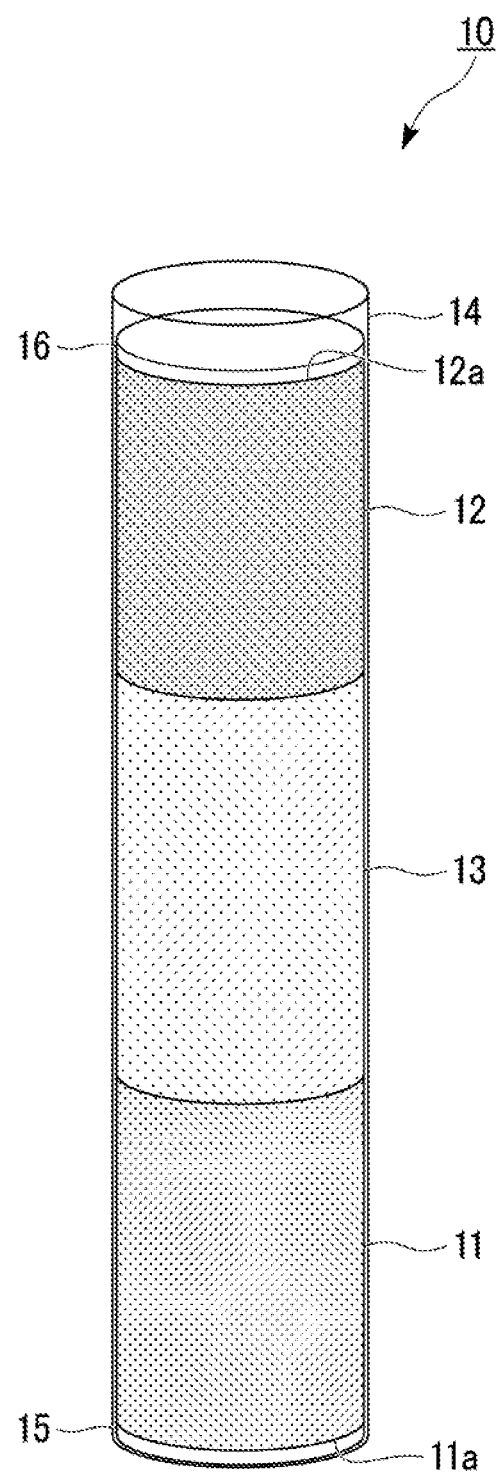
FIG. 1 is a schematic diagram showing a nanocarbon separation device of a first embodiment.

FIG. 1 is a schematic diagram showing a nanocarbon separation device of the embodiment.

A nanocarbon separation device 10 of the embodiment includes a first porous structure 11 configured to hold a solution containing a surfactant, a second porous structure 12 configured to hold a dispersion medium, a holding part 13, a separation tank 14, a first electrode 15 provided to come into contact with a lower section of the first porous structure 11, and a second electrode 16 provided to come into contact with an upper section of the second porous structure 12. The holding part 13 is provided between the first porous structure 11 and the second porous structure 12, includes a metal type nanocarbon, a semiconductor type nanocarbon and a surfactant, and holds a dispersion liquid (hereinafter, referred to as a "nanocarbon dispersion liquid") having a smaller surfactant content than that of the solution containing the surfactant. The first porous structure 11, the holding part 13 and the second porous structure 12 are disposed in this order and accommodated in the separation tank 14. In addition, the nanocarbon separation device 10 of the embodiment may include a direct current power supply (not shown) configured to apply a direct current voltage between the first electrode 15 and the second electrode 16.

In the nanocarbon separation device 10 of the embodiment, a case in which the first electrode 15 is provided to come into contact with a lower end (a lower surface) 11a of the first porous structure 11 and the second electrode 16 is provided to come into contact with an upper end (an upper surface) 12a of the second porous structure 12 is exemplified.

For example, as shown in FIG. 1, the first porous structure 11 and the second porous structure 12 are formed of a sponge that is a porous soft object in which numerous fine holes (hereinafter, referred to as "pores") are formed.

An external form of the first porous structure 11 is not particularly limited as long as the solution containing the surfactant can infiltrate thereinto and be held therein. In addition, an external form of the second porous structure 12 is not particularly limited as long as the dispersion medium can infiltrate thereinto and be held therein. As the external forms of the first porous structure 11 and the second porous structure 12, for example, a columnar shape, a triangular prismatic shape, a quadrangular prismatic shape, a polygonal prismatic shape of a pentagon or more, or the like, may be exemplified.

The sponge that forms the first porous structure 11 and the second porous structure 12 is not particularly limited. A material of the sponge is not particularly limited as long as the material is stable with respect to the solution containing the surfactant and the dispersion medium and is an insulating material. The sponge is a porous body in which numerous fine holes are formed. Examples of the sponge include those formed of natural sponge, artificial sponge formed of a synthetic resin, and the like. In addition, instead of the sponge, a gel, a pumice stone, or the like, may be used in the first porous structure 11 and the second porous structure 12.

In addition, the first porous structure 11 and the second porous structure 12 may have a plurality of regions layered in a thickness direction. That is, the first porous structure 11 and the second porous structure 12 may be obtained by laminating a plurality of plate-shaped units having a predetermined thickness. The thickness direction is, for example, a disposition direction of the first porous structure 11, the holding part 13 and the second porous structure 12 in the separation tank 14. In other words, the thickness direction is, for example, a direction in which the carbon nanotubes are separated. The plurality of units (regions) may have the same thickness or may have different thicknesses. After metal type nanocarbons and semiconductor type nanocarbons are separated, only a region in which nanocarbons thereof are contained can be extracted as long as the first porous structure 11 and the second porous structure 12 have a plurality of regions layered in the thickness direction.

Sizes (heights, outer diameters, volumes, and the like) of the first porous structure 11 and the second porous structure 12 are not particularly limited, and appropriately adjusted according to an amount of the solution held in the first porous structure 11 or an amount of the dispersion medium held in the second porous structure 12.

A porosity degree (porosity) in the first porous structure 11 and the second porous structure 12 may be any porosity degree as long as nanocarbon micelles can pass therethrough, pores are continuously connected, and a potential gradient is formed between upper and lower electrodes. For example, the porosity degree (porosity) in the first porous structure 11 and the second porous structure 12 using the synthetic sponge is preferably 80% or more and 99.9% or less, or more preferably 90% or more and 99% or less.

When the porosity degree in the first porous structure 11 and the second porous structure 12 is equal to or greater than 80%, the pores communicate with each other in the entire region of the first porous structure 11 and the second porous structure 12. For this reason, in separation of the nanocarbon dispersion liquid using the nanocarbon separation device 10, the first porous structure 11 and the second porous structure 12 do not prevent movement of the metal type nanocarbons and the semiconductor type nanocarbons contained in the nanocarbon dispersion liquid. Accordingly, the metal type nanocarbons and the semiconductor type nanocarbons contained in the nanocarbon dispersion liquid can be efficiently separated. When the porosity degree in the first porous structure 11 and the second porous structure 12 is equal to or less than 99.9%, the solution infiltrating into the first porous structure 11 can be stably held in the first porous structure 11, and the dispersion medium infiltrated into the second porous structure 12 can be stably held in the second porous structure 12.

The porosity degree of the first porous structure 11 and the second porous structure 12 relates to a proportion of the first porous structure 11 and the second porous structure 12 occupied by pores with respect to the entire volume of the first porous structure 11 and the second porous structure 12. The porosity degree of the first porous structure 11 and the second porous structure 12 is represented as, for example, the following formula (1).

$$a1/A1 \times 100 \qquad (1)$$

That is, the porosity degree of the first porous structure 11 and the second porous structure 12 is represented as a percentage of a ratio between a total volume a1 of the pores in the first porous structure 11 and the second porous structure 12 and a total volume A1 of the first porous structure 11 and the second porous structure 12 including the pores.

As a method of obtaining the porosity degree of the first porous structure 11 and the second porous structure 12, the following method is exemplified. In this method, for example, an apparent specific gravity d1 of the first porous structure 11 and the second porous structure 12 including the pores and a true specific gravity D1 of the first porous structure 11 and the second porous structure 12 including the pores are obtained, and the porosity degree of the first porous structure 11 and the second porous structure 12 is calculated on the basis of these specific gravities. In this method, the porosity degree of the first porous structure 11 and the second porous structure 12 is calculated on the basis of the following formula (2).

$$(D1-d1)/D1 \times 100 \qquad (2)$$

Sizes of the pores in the first porous structure 11 and the second porous structure 12, i.e., inner diameters of the pores are preferably equal to or greater than 40 nm, and more preferably equal or greater than 100 nm. In addition, the inner diameters of the pores in the first porous structure 11 and the second porous structure 12 are equal to or less than 1 cm, and more preferably equal to or less than 1 mm.

When the inner diameters of the pores in the first porous structure 11 and the second porous structure 12 are equal to or greater than 40 nm, in separation of the nanocarbon dispersion liquid using the nanocarbon separation device 10, the first porous structure 11 and the second porous structure 12 do not prevent movement of the metal type nanocarbons and the semiconductor type nanocarbons contained in the nanocarbon dispersion liquid. Accordingly, the metal type nanocarbons and the semiconductor type nanocarbons contained in the nanocarbon dispersion liquid can be efficiently separated.

Further, shapes of the pores in the first porous structure 11 and the second porous structure 12 are irregular shapes, for example, spherical shapes, spheroidal shapes, and the like. For this reason, the inner diameters of the pores in the first porous structure 11 and the second porous structure 12 are diameters of spherical bodies when the pores are formed in spherical shapes, large diameters of spheroidal shapes when the pores are formed in spheroidal shapes, and lengths of the longest portion of the shape when the pores are formed in shapes other than spherical shapes and spheroidal shapes.

As a method of obtaining the sizes of the pores in the first porous structure 11 and the second porous structure 12, for example, a method of observing the first porous structure 11 and the second porous structure 12 using an optical microscope or a scanning electron microscope and actually measuring the sizes of the pores on the basis of microscopic images thereof, or the like, is exemplified.

The first porous structure 11 and the second porous structure 12 are preferably transparent, milky-white translucent (white that can see through the back), or milky-white (white that is not transparent, translucent), in order to easily allow a separation state of the metal type nanocarbons and the semiconductor type nanocarbons contained in the nanocarbon dispersion liquid to be checked. When separation of the metal type nanocarbons and the semiconductor type nanocarbons is performed, the nanocarbon dispersion liquid is colored according to diameters and chirality of the nanocarbons. Here, the separation state of the metal type nanocarbons and the semiconductor type nanocarbons can be visually checked using colors of the first porous structure 11 and the second porous structure 12 as a background.

A conductive film is preferably provided on the lower end 11a of the first porous structure 11 to secure conduction between the first porous structure 11 and the first electrode 15 by increasing a degree of adhesion to the first electrode 15. Similarly, a conductive film is preferably provided on the upper end 12a of the second porous structure 12 to secure conduction between the second porous structure 12 and the second electrode 16 by increasing a degree of adhesion to the second electrode 16. As a conductive film, for example, an anisotropic conductive film or the like generated by forming a mixture of fine metal grains and a binding material such as a thermosetting resin into a film form may be exemplified.

An area of the first electrode 15 in contact with the first porous structure 11 via the conductive film can be increased by providing the conductive film on the lower end 11a of the first porous structure 11. In addition, a contact area of the second electrode 16 with the second porous structure 12 via the conductive film can be increased by providing the conductive film on the upper end 12a of the second porous structure 12. For example, application of a direct current voltage between the first electrode 15 and the second electrode 16 from a direct current power supply can be efficiently performed.

In the nanocarbon separation device 10 of the embodiment, the holding part 13 is formed of a third porous structure. The third porous structure that forms the holding part 13 is not particularly limited as long as the structure is stable with respect to the nanocarbon dispersion liquid, the nanocarbon dispersion liquid infiltrates into the structure, and the nanocarbon dispersion liquid can be held in the surface. The third porous structure that forms the holding part 13 is preferably the same as the first porous structure 11 and the second porous structure 12.

The separation tank 14 is an electrophoretic tank having an I-type (vertical) structure. In addition, the separation tank 14 has a space configured to accommodate the first porous structure 11 that holds a solution containing a surfactant, the second porous structure 12 that holds a dispersion medium, and the holding part (the third porous structure) 13 that holds a nanocarbon dispersion liquid. A shape or a size of the separation tank 14 is not particularly limited as long as the separation tank 14 can accommodate the first porous structure 11 that holds the solution containing the surfactant, the second porous structure 12 that holds the dispersion medium, and the holding part 13 that holds the nanocarbon dispersion liquid. An internal shape of the separation tank 14 is preferably a shape similar to external forms of the first porous structure 11, the second porous structure 12 and the holding part 13.

The separation tank 14 having the I-type structure is, for example, a container having a hollow pipe shape. The separation tank 14 having the I-type structure may have a structure that can support the first porous structure 11, the holding part 13 and the second porous structure 12, for example, a structure having an upper end with an opening and a lower end that is closed to form a bottom of a container. The separation tank 14 having the I-type structure stands up in a longitudinal direction on a horizontal surface.

The first porous structure 11, the holding part 13 and the second porous structure 12 are disposed in this order and accommodated in the separation tank 14. That is, in the separation tank 14, the first porous structure 11 and the holding part 13 are in contact with each other, and the holding part 13 and the second porous structure 12 are in contact with each other.

A material of the separation tank 14 is not particularly limited as long as the material is stable with respect to the nanocarbon dispersion liquid and is an insulating material. As the material of the separation tank 14, for example, glass, quartz, acrylic resin, and the like, are exemplified.

In the nanocarbon separation device 10 of the embodiment, the first electrode 15 is a positive electrode, and the second electrode 16 is a negative electrode. In this case, when a direct current voltage is applied to the first electrode 15 and the second electrode 16, an orientation of an electric field is directed from the lower end 11a of the first porous structure 11 toward the upper end 12a of the second porous structure 12.

The first electrode 15 and the second electrode 16 are not particularly limited as long as the electrodes can be used in electrophoresis and are stable with respect to the nanocarbon dispersion liquid. As the first electrode 15 and the second electrode 16, for example, a platinum electrode or the like is exemplified.

The first electrode 15 comes into contact with the lower end 11a of the first porous structure 11 and is fixed to the lower end 11a of the first porous structure 11. The second electrode 16 comes in contact with the upper end 12a of the second porous structure 12 and is fixed to the upper end 12a of the second porous structure 12.

Structures of the first electrode 15 and the second electrode 16 are not particularly limited and may be appropriately selected according to a shape, a size, or the like, of the first porous structure 11 or the second porous structure 12. As the structures of the first electrode 15 and the second electrode 16, for example, when seen in a plan view of the separation tank 14, an annular shape, a disk shape, a rod shape, or the like, is exemplified. In addition, as the structures of the first electrode 15 and the second electrode 16, for example, a porous plate shape in which a plurality of fine pores are homogenously provided.

Further, while the case in which the first electrode 15 is provided on substantially the entire surface of the lower end 11a of the first porous structure 11 and the second electrode 16 is provided on the substantially entire surface of the upper end 12a of the second porous structure 12 has been exemplified in FIG. 1, the nanocarbon separation device 10 of the embodiment is not limited thereto. In the nanocarbon separation device 10 of the embodiment, the first electrode 15 may be provided on at least part of the lower end 11a of the first porous structure 11, and in addition, the second electrode 16 may be provided on at least a part of the upper end 12a of the second porous structure 12 as long as a direct current voltage can be sufficiently applied to between the first electrode 15 and the second electrode 16.

The first electrode 15 and the second electrode 16 are accommodated in the separation tank 14. That is, the first electrode 15 is provided on a lower section in the separation tank 14, and the second electrode 16 is provided on an upper section in the separation tank 14. Then, the first porous structure 11, the holding part 13 and the second porous structure 12 are disposed in this order between the first electrode 15 and the second electrode 16 in the separation tank 14 to extend in a height direction of the separation tank 14.

The direct current power supply is not particularly limited as long as a direct current voltage can be applied to between the first electrode 15 and the second electrode 16.

In the nanocarbon separation device 10 of the embodiment, while the case in which the first electrode 15 is the positive electrode and the second electrode 16 is the negative electrode has been exemplified, the nanocarbon separation device 10 of the embodiment is not limited thereto. In the nanocarbon separation device 10 of the embodiment, the first electrode 15 may be a negative electrode, and the second electrode 16 may be a positive electrode.

According to the nanocarbon separation device 10 of the embodiment, the first porous structure 11 configured to hold the solution containing the surfactant, the second porous structure 12 configured to hold the dispersion medium, and the holding part 13 are provided between the first electrode 15 and the second electrode 16 in the separation tank 14. The holding part 13 holds the nanocarbon dispersion liquid containing the metal type nanocarbons, the semiconductor type nanocarbons and the surfactant, and having a content of the surfactant that is smaller than that of the solution containing the surfactant. Accordingly, in a nanocarbon separation method, which will be described below, a time for introducing a liquid into the separation tank 14 can be greatly reduced.

(Variant of Nanocarbon Separation Device)

Figure 2:
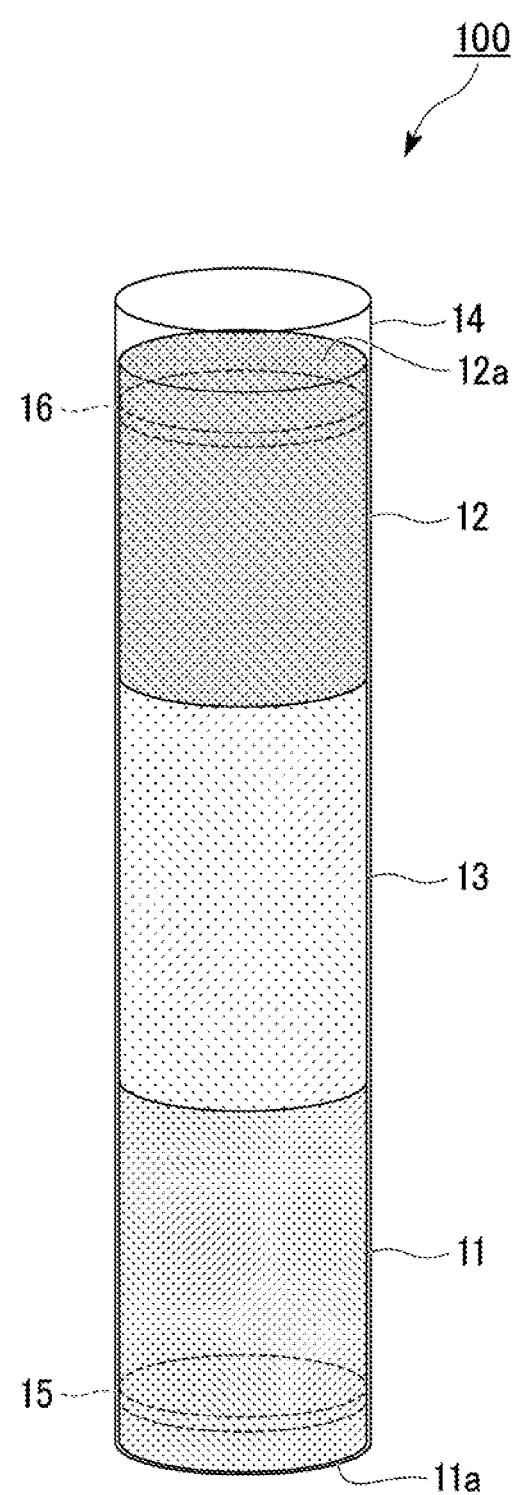
FIG. 2 is a schematic diagram showing a variant of the nanocarbon separation device of the first embodiment.

FIG. 2 is a schematic diagram showing a variant of the nanocarbon separation device of the embodiment. Further, in FIG. 2, components the same as those of the nanocarbon separation device of the first embodiment shown in FIG. 1 are designated by the same reference numerals, and overlapping description thereof will be omitted.

A nanocarbon separation device 100 of the variant is distinguished from the above-mentioned nanocarbon separation device 10 in that the first electrode 15 is provided in the first porous structure 11, and the second electrode 16 is provided in the second porous structure 12. As a result, a voltage can be efficiently applied to the nanocarbon dispersion liquid accommodated in the separation tank 14.

(Nanocarbon Separation Method)

An action of the nanocarbon separation device 10 will be described with reference to FIGS. 1 to 6 while describing a nanocarbon separation method using the nanocarbon separation device 10.

The nanocarbon separation method of the embodiment has a disposition process, a contact process and a separation process. In the disposition process, the first porous structure 11 in which the solution containing the surfactant is held, the holding part 13 in which the nanocarbon dispersion liquid is held, and the second porous structure 12 in which the dispersion medium is held are disposed in this order in the separation tank 14. In the contact process, the first electrode 15 comes in contact with at least part of the lower end 11a of the first porous structure 11, and the second electrode 16 comes in contact with at least part of the upper end 12a of the second porous structure 12. In the separation process, a direct current voltage is applied to between the first electrode 15 and the second electrode 16, the metal type nanocarbons contained in the nanocarbon dispersion liquid are moved toward the second electrode 16 while moving the semiconductor type nanocarbons contained in the nanocarbon dispersion liquid toward the first electrode 15, and thus, the metal type nanocarbons and the semiconductor type nanocarbons are separated.

In addition, the nanocarbon separation method of the embodiment may have a process of collecting the metal type nanocarbons and the semiconductor type nanocarbons contained in the nanocarbon dispersion liquid after the separation process (hereinafter, referred to as a "collecting process").

In the nanocarbon separation method of the embodiment, for example, the nanocarbon means a carbon material that is mainly constituted by carbon, such as a single-walled carbon nanotube, a double-walled carbon nanotube, a multi-walled carbon nanotube, a carbon nanohorn, a carbon nanotwist, a graphene, a fullerene, or the like. In the nanocarbon separation method of the embodiment, a case in which the semiconductor type single-walled carbon nanotubes and the metal type single-walled carbon nanotubes are separated from the nanocarbon dispersion liquid containing the single-walled carbon nanotubes as the nanocarbons will be described below.

Single-walled carbon nanotubes are known to be able to be classified according to the two different properties thereof such as a metal type and a semiconductor type according to a diameter of a tube and a winding method. When the single-walled carbon nanotubes are synthesized using a conventional manufacturing method, a mixture of the single-walled carbon nanotubes in which the metal type single-walled carbon nanotubes having metallic properties and the semiconductor type single-walled carbon nanotube having semiconductive properties are contained at a ratio of 1:2 statistically is obtained.

The mixture of the single-walled carbon nanotubes is not particularly limited as long as the metal type single-walled carbon nanotubes and the semiconductor type single-walled carbon nanotubes are contained. In addition, the single-walled carbon nanotube in the embodiment may be a single body of the single-walled carbon nanotube, or may be a single-walled carbon nanotube in which some carbon is replaced with an arbitrary functional group or a single-walled carbon nanotube modified by an arbitrary functional group.

The mixture of the single-walled carbon nanotube is distributed in the dispersion medium together with the surfactant, and thus, the single-walled carbon nanotube dispersion liquid is prepared. The single-walled carbon nanotube dispersion liquid is held in the holding part 13.

The dispersion medium is not particularly limited as long as the mixture of the single-walled carbon nanotube can be distributed. As the dispersion medium, for example, water, heavy water, organic solvents, ionic liquids, and the like, may be exemplified. Among these dispersion mediums, water or heavy water is preferably used due to the reason that in this case single-walled carbon nanotubes do not degenerate therein.

As the surfactant, for example, a nonionic surfactant, a cationic surfactant, an anionic surfactant, or the like, is used. In order to prevent ionic impurities such as sodium ions or the like from being mixed with the single-walled carbon nanotubes, the nonionic surfactant is preferably used.

As the nonionic surfactant, a nonionic surfactant having a non-ionizable hydrophilic area and a hydrophobic area such as an alkyl chain is used. As such a nonionic surfactant, for example, a nonionic surfactant having a polyethylene glycol structure represented by polyoxyethylene alkyl ethers is exemplified.

As such a nonionic surfactant, polyoxyethylene alkyl ether expressed by the following formula (3) is appropriately used.

$$C_nH_{2n}(OCH_2CH_2)_mOH \qquad (3)$$

(provided, n=12 to 18 and m=20 to 100)

As the polyoxyethylene alkyl ether expressed by the formula (3), for example, polyoxyethylene (23) lauryl ether (Trade Name: Brij L23, manufactured by Sigma Aldrich Corporation), polyoxyethylene (20) cetyl ether (Trade Name: Brij C20, manufactured by Sigma Aldrich Corporation), polyoxyethylene (20) stearyl ether (Trade Name: Brij S20, manufactured by Sigma Aldrich Corporation), polyoxyethylene (20) oleyl ether (Trade Name: Brij O20, manufactured by Sigma Aldrich Corporation), polyoxyethylene (100) stearyl ether (Trade Name: Brij S100, manufactured by Sigma Aldrich Corporation), or the like, is exemplified.

As the nonionic surfactant, polyoxyethylene sorbitan monostearate (molecular formula: C64H126O26, Trade Name: Tween 60, manufactured by Sigma Aldrich Corporation), polyoxyethylene sorbitan trioleate (molecular formula: C24H44O6, Trade Name: Tween 85, manufactured by Sigma Aldrich Corporation), octylphenol ethoxylate (molecular formula: C14H22O(C2H4O)n, n=1 to 10, Trade Name: Triton X-100, manufactured by Sigma Aldrich Corporation), polyoxyethylene (40) isooctyl phenyl ether (molecular formula: C8H17C6H4O(CH2CH2O)40H, Trade Name: Triton X-405, manufactured by Sigma Aldrich Corporation), poloxamer (molecular formula: C5H10O2, Trade Name: Pluronic, manufactured by Sigma Aldrich Corporation), polyvinyl pyrrolidone (molecular formula: (C6H9NO)n, n=5 to 100, manufactured by Sigma Aldrich Corporation) may also be exemplified.

A content of the nonionic surfactant in the single-walled carbon nanotube dispersion liquid is preferably 0.1 wt % or more and 5 wt % or less, and more preferably, 0.5 wt % or more and 2 wt % or less.

When the content of the nonionic surfactant is 5 wt % or less, the viscosity of the single-walled carbon nanotube dispersion liquid does not become too high. For this reason, the metal type single-walled carbon nanotubes and the semiconductor type single-walled carbon nanotubes contained in the single-walled carbon nanotube dispersion liquid can be easily separated through the electrophoresis.

The content of the single-walled carbon nanotubes in the single-walled carbon nanotube dispersion liquid is preferably 1 μg/mL or more and 100 μg/mL or less, and preferably, 5 μg/mL or more and 40 μg/mL or less.

When the content of the single-walled carbon nanotube is the above-mentioned range, the metal type single-walled carbon nanotubes and the semiconductor type single-walled carbon nanotubes contained in the single-walled carbon nanotube dispersion liquid can be easily separated through the electrophoresis.

The method of preparing the single-walled carbon nanotube dispersion liquid is not particularly limited, and a known method is used as the method. For example, a method of ultrasonicating the liquid mixture of the mixture of the single-walled carbon nanotube and the dispersion medium containing the surfactant, and dispersing the mixture of the single-walled carbon nanotubes in the dispersion medium is exemplified. The metal type single-walled carbon nanotubes and the semiconductor type single-walled carbon nanotubes, which are aggregated, are sufficiently separated through the ultrasonication. Accordingly, the single-walled carbon nanotube dispersion liquid is obtained by uniformly dispersing the metal type single-walled carbon nanotubes and the semiconductor type single-walled carbon nanotubes in the dispersion medium. Accordingly, the metal type single-walled carbon nanotubes and the semiconductor type single-walled carbon nanotubes are easily separated through the electrophoresis, which will be described below. Further, the metal type single-walled carbon nanotubes and the semiconductor type single-walled carbon nanotubes not dispersed through the ultrasonication are preferably separated and removed through ultracentrifugation.

The surfactant is dissolved in the dispersion medium, and thus, the solution is prepared. The solution is held in the first porous structure 11. Further, as the surfactant and the dispersion medium contained in the solution, the same materials as the surfactant and the dispersion medium contained in the single-walled carbon nanotube dispersion liquid are used. In addition, the content of the surfactant in the solution is set to be higher than the content of the surfactant in the single-walled carbon nanotube dispersion liquid.

Next, a process of holding the solution containing the surfactant in the first porous structure 11 is performed. In the process, for example, the first porous structure 11 is disposed in the liquid tank. Next, the solution containing the surfactant is injected into the liquid tank, the solution infiltrates into the first porous structure 11 in the liquid tank, and the solution is held in the first porous structure 11.

In addition, a process of holding the dispersion medium in the second porous structure 12 is performed. In the process, for example, the second porous structure 12 is disposed in the liquid tank. Next, the dispersion medium is injected into the liquid tank, the dispersion medium infiltrates into the second porous structure 12 in the liquid tank, and the solution is held in the second porous structure 12. Further, the solution having the content of the surfactant smaller than that of the single-walled carbon nanotube dispersion liquid can also be held in the second porous structure 12.

In addition, a process of holding the single-walled carbon nanotube dispersion liquid in the holding part 13 is performed. In the process, for example, the holding part 13 is disposed in the liquid tank. Next, the single-walled carbon nanotube dispersion liquid is injected into the liquid tank, the single-walled carbon nanotube dispersion liquid infiltrates into the holding part 13 in the liquid tank, and the single-walled carbon nanotube dispersion liquid is held in the holding part 13.

Figure 3:
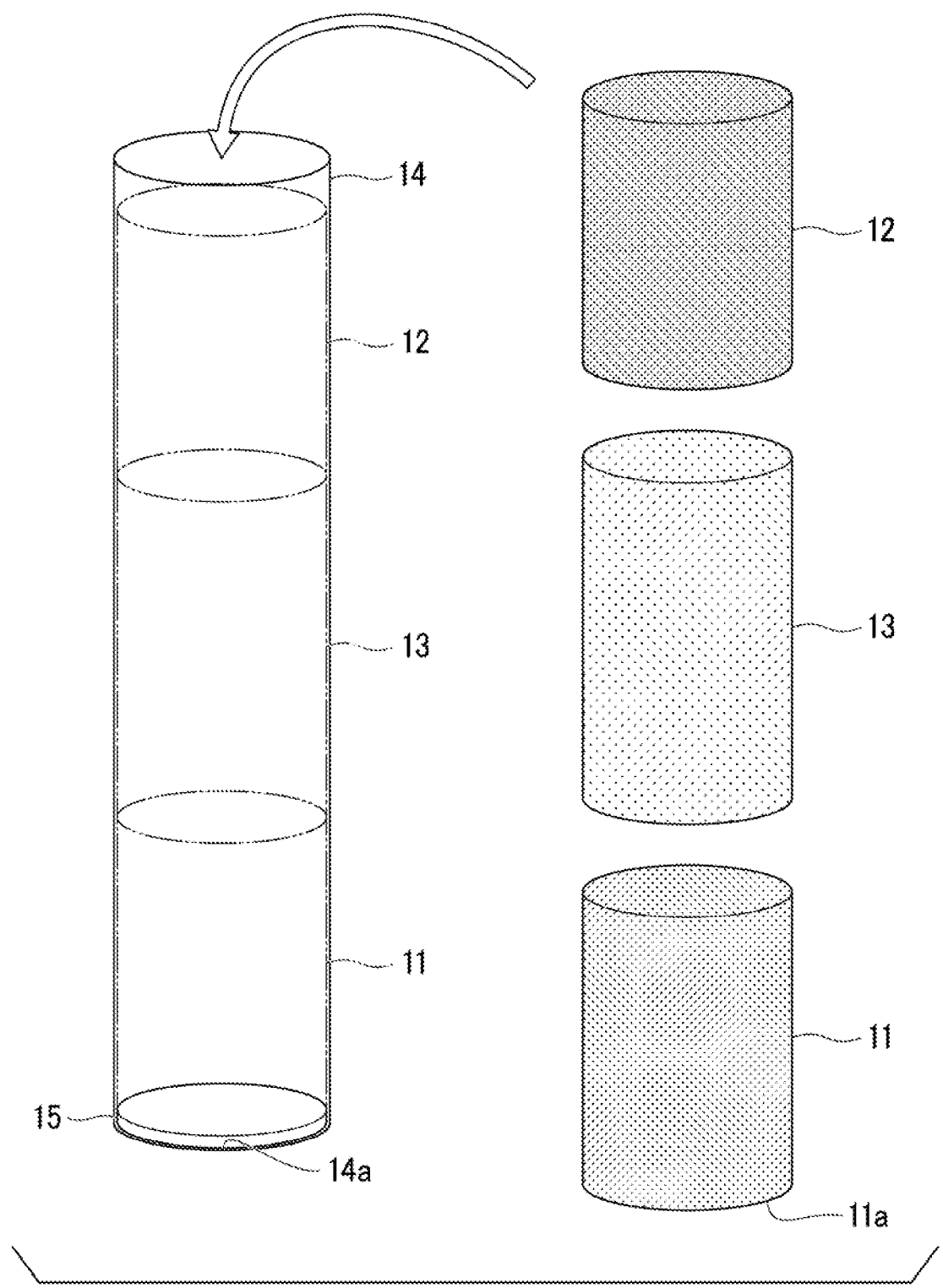
FIG. 3 is a schematic diagram showing a nanocarbon separation method of the first embodiment.
Figure 6:
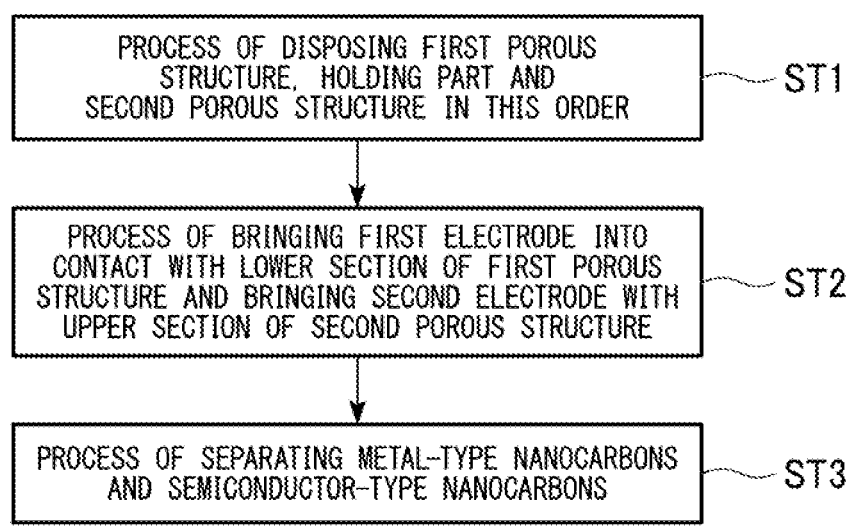
FIG. 6 is a flowchart showing the nanocarbon separation method of the first embodiment.

Next, in the disposition process, as shown in FIG. 3, a process of disposing the first porous structure 11 in which the solution containing the surfactant is held, the holding part 13 in which the single-walled carbon nanotube dispersion liquid is held, and the second porous structure 12 in which the dispersion medium is held in the separation tank 14 in this order is performed (ST1 in FIG. 6).

In the disposition process, the first electrode 15 is preferably provided on a lower surface 14a in the separation tank 14.

In addition, in the disposition process, the first porous structure 11, the holding part 13 and the second porous structure 12 may be disposed in this order in the separation tank 14, and the lower end 11a of the first porous structure 11 may not come in contact with the first electrode 15.

Next, in the contact process, for example, as shown in FIG. 1, a process of bringing the first electrode 15 into contact with at least part of the lower end 11a of the first porous structure 11 and bringing the second electrode 16 into contact with at least part of the upper end 12a of the second porous structure 12 is performed (ST2 in FIG. 6).

Figure 4:
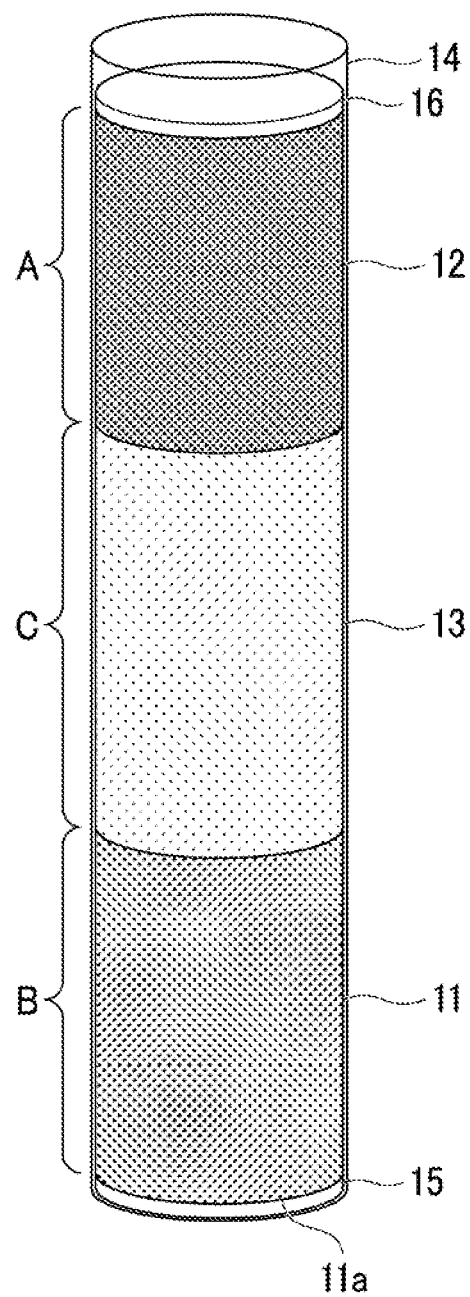
FIG. 4 is a schematic diagram showing the nanocarbon separation method of the first embodiment.

Next, in the separation process, as shown in FIG. 4, a process of moving the metal type single-walled carbon nanotubes contained in the single-walled carbon nanotube dispersion liquid toward the second electrode 16 while moving the semiconductor type single-walled carbon nanotubes contained in the single-walled carbon nanotube dispersion liquid held in the holding part 13 toward the first electrode 15 is performed through electrophoresis. Accordingly, the metal type single-walled carbon nanotubes and the semiconductor type single-walled carbon nanotubes are separated (ST3 in FIG. 6).

In the single-walled carbon nanotube dispersion liquid, the metal type single-walled carbon nanotubes have positive charges, and the semiconductor type single-walled carbon nanotubes have extremely weak negative charges.

Accordingly, when a direct current voltage is applied to the first electrode 15 and the second electrode 16, in the mixture of the single-walled carbon nanotubes contained in the single-walled carbon nanotube dispersion liquid, the semiconductor type single-walled carbon nanotubes are moved toward the first electrode 15 (the positive electrode), and the metal type single-walled carbon nanotubes are moved toward the second electrode 16 (the negative electrode). As a result, as shown in FIG. 4, a dispersion liquid phase A, a dispersion liquid phase B and a dispersion liquid phase C are formed. The dispersion liquid phase A is a dispersion liquid phase having a relatively large content of the metal type single-walled carbon nanotubes in the second porous structure 12. The dispersion liquid phase B is a dispersion liquid phase having a relatively large content of the semiconductor type single-walled carbon nanotubes in the first porous structure 11. The dispersion liquid phase C is a dispersion liquid phase formed between the dispersion liquid phase A and the dispersion liquid phase B in the holding part 13 and having a relatively small content of the metal type single-walled carbon nanotubes and the semiconductor type single-walled carbon nanotubes.

The direct current voltage applied to the first electrode 15 and the second electrode 16 is not particularly limited and appropriately adjusted according to a distance between the first electrode 15 and the second electrode 16, a content of the mixture of the single-walled carbon nanotubes in the nanocarbon dispersion liquid, or the like.

When water or heavy water is used as the dispersion medium of the nanocarbons, the direct current voltage applied to the first electrode 15 and the second electrode 16 is an arbitrary value of larger than 0 V and equal or less than 1000 V.

For example, a case in which the distance between the first electrode 15 and the second electrode 16 (a distance between electrodes), i.e., a height of a laminated body constituted by the first porous structure 11, the holding part 13 and the second porous structure 12 is 30 cm is exemplified. In this case, the direct current voltage applied to the first electrode 15 and the second electrode 16 is preferably 15 V or more and 450 V or less, and more preferably 30 V or more and 300 V or less.

When the direct current voltage applied to the first electrode 15 and the second electrode 16 is equal to or greater than 15 V, the metal type single-walled carbon nanotubes and the semiconductor type single-walled carbon nanotubes contained in the single-walled carbon nanotube dispersion liquid can be separated. When the direct current voltage applied to the first electrode 15 and the second electrode 16 is equal to or less than 450 V, electrolysis of water or heavy water is minimized.

In addition, when the direct current voltage is applied to the first electrode 15 and the second electrode 16, an electric field between the first electrode 15 and the second electrode 16 is preferably 0.5 V/cm or more and 15 V/cm or less, and more preferably 1 V/cm or more and 10 V/cm or less.

When the electric field between the first electrode 15 and the second electrode 16 is equal to or greater than 0.5 V/cm, the metal type single-walled carbon nanotubes and the semiconductor type single-walled carbon nanotubes contained in the single-walled carbon nanotube dispersion liquid can be separated. When the electric field between the first electrode 15 and the second electrode 16 is equal to or less than 15 V/cm, electrolysis of water or heavy water is minimized.

In the separation process, temperatures of the solution held in the first porous structure 11, the single-walled carbon nanotube dispersion liquid held in the holding part 13, and the dispersion medium held in the second porous structure 12 are not particularly limited as long as the temperatures are temperatures at which the dispersion medium in the single-walled carbon nanotube dispersion liquid is not degenerated or evaporated.

When the separation of the metal type single-walled carbon nanotubes and the semiconductor type single-walled carbon nanotubes is performed, the single-walled carbon nanotube dispersion liquid having a large content of the metal type single-walled carbon nanotubes becomes block, and the nanocarbon dispersion liquid is colored according to a diameter and chirality of the single-walled carbon nanotubes. Here, the separation state of the metal type single-walled carbon nanotubes and the semiconductor type single-walled carbon nanotubes are visually checked using colors of the first porous structure 11, the second porous structure 12 and the holding part 13 as a background. When the separation state is visually checked, the separation process is terminated at the time when the color of the single-walled carbon nanotube dispersion liquid is not changed.

A state of the coloration in the single-walled carbon nanotube dispersion liquid can also be automated using image recognition by a camera, measurement of an optical absorption spectrum, or the like.

Next, in the collecting process, a process of collecting the metal type single-walled carbon nanotubes and the semiconductor type single-walled carbon nanotubes contained in the single-walled carbon nanotube dispersion liquid is performed. That is, the separated dispersion liquid phase B is collected (preparatively isolated) from the first porous structure 11, and the separated dispersion liquid phase A is collected (preparatively isolated) from the second porous structure 12.

The collecting method of the dispersion liquid phase A and the dispersion liquid phase B is not particularly limited, and may be any method as long as the collecting method is a method in which the dispersion liquid phase A and the dispersion liquid phase B are not dispersed and mixed.

As the collecting method, for example, the following method is used.

Figure 5:
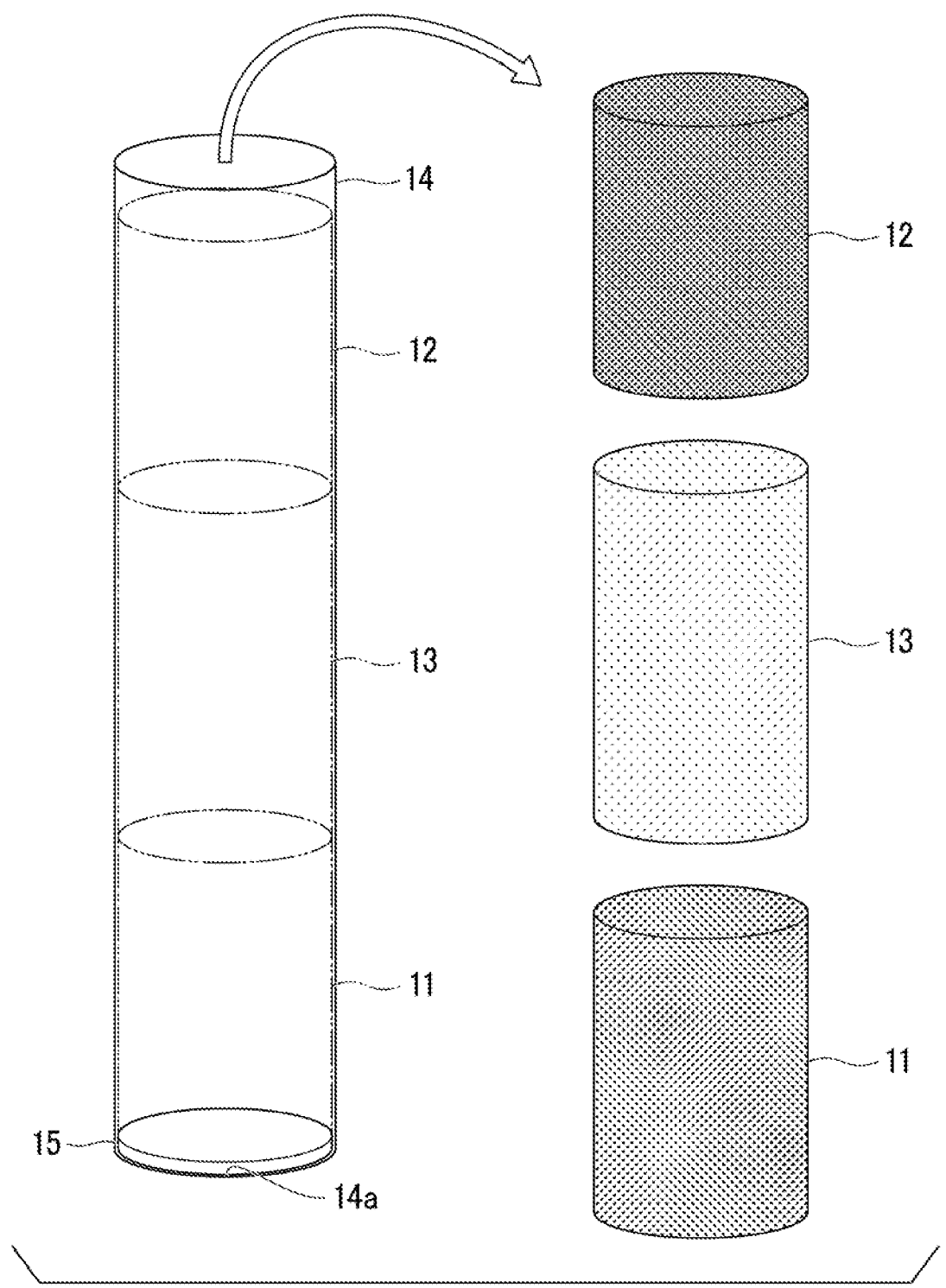
FIG. 5 is a schematic diagram showing the nanocarbon separation method of the first embodiment.

As the collecting method, the following method is exemplified. For example, as shown in FIG. 5, there is a method of collecting the first porous structure 11 containing the dispersion liquid phase B, the second porous structure 12 containing the dispersion liquid phase A and the holding part 13 containing the dispersion liquid phase C from the separation tank 14, collecting (preparatively isolating) the semiconductor type single-walled carbon nanotubes from the first porous structure 11, and collecting (preparatively isolating) the metal type single-walled carbon nanotubes from the second porous structure 12.

The collected dispersion liquid is held in the holding part 13 again, and as described above, an operation of separating the metal type single-walled carbon nanotubes and the semiconductor type single-walled carbon nanotubes contained in the single-walled carbon nanotube dispersion liquid through electrophoresis may be repeatedly performed. Accordingly, it is possible to obtain the metal type single-walled carbon nanotubes and the semiconductor type single-walled carbon nanotubes having higher purity.

Separation efficiency of the collected dispersion liquid can be estimated through a method such as a microscopic Raman spectrometric method (a variation in Raman spectrum in a radial breathing mode (RBM) region, a variation in a Raman spectrum shape of a Breit-Wigner-Fano (BWF) region), ultraviolet-visible near infrared absorptiometry (a variation in peak shape of an absorption spectrum), and the like. In addition, the separation efficiency of the dispersion liquid can be estimated even by estimating an electrical property of the single-walled carbon nanotube. For example, the separation efficiency of the dispersion liquid can be estimated by fabricating an electric field effect transistor and measuring transistor characteristics thereof.

According to the nanocarbon separation method using the nanocarbon separation device 10 of the embodiment, for example, the solution containing the surfactant is quietly introduced into the lower section of the separation tank 14, the single-walled carbon nanotube dispersion liquid is quietly introduced thereon, water is quietly introduced further thereon, and a layer formed of three liquids having different contents of the surfactant is formed. The single-walled carbon nanotube dispersion liquid contains the single-walled carbon nanotube and surfactant, and has a content of the surfactant that is smaller than that of the solution containing the surfactant. After formation of the layer, the metal type single-walled carbon nanotubes and the semiconductor type single-walled carbon nanotubes can be more rapidly and efficiently separated through the electrophoresis than a nanocarbon separation method of separating the metal type single-walled carbon nanotubes and the semiconductor type single-walled carbon nanotubes contained in the single-walled carbon nanotube dispersion liquid (hereinafter, referred to as "a nanocarbon separation method α").

That is, in the nanocarbon separation method α, in order to form the layer formed of three liquids, the liquids should be quietly introduced into the separation tank 14 such that two neighboring layers are not mixed with each other. For this reason, an extremely long time is required. According to the nanocarbon separation method using the nanocarbon separation device 10 of the embodiment, the first porous structure 11 in which the solution containing the surfactant is previously held, the holding part 13 in which the single-walled carbon nanotube dispersion liquid is previously held, and the second porous structure 12 in which the dispersion medium is previously held are accommodated in the separation tank 14. After that, the metal type single-walled carbon nanotubes and the semiconductor type single-walled carbon nanotubes contained in the single-walled carbon nanotube dispersion liquid are separated. For this reason, a time for introducing the liquids into the separation tank 14 is greatly reduced, and as a result, the metal type nanocarbons and the semiconductor type nanocarbons can be rapidly and efficiently separated.

In addition, according to the nanocarbon separation method using the nanocarbon separation device 10 of the embodiment, the separating operation can be realized as follows. That is, after the separating operation of the metal type single-walled carbon nanotubes and the semiconductor type single-walled carbon nanotubes is terminated, the separated semiconductor type single-walled carbon nanotubes can be efficiently collected from the first porous structure 11, and the separated metal type single-walled carbon nanotubes can be efficiently collected from the second porous structure 12.

Further, in the nanocarbon separation method of the embodiment, the case in which the mixture of the single-walled carbon nanotubes is separated into the metal type single-walled carbon nanotubes and the semiconductor type single-walled carbon nanotubes has been exemplified. However, the nanocarbon separation method of the embodiment is not limited thereto. The nanocarbon separation method of the embodiment may be performed as, for example, a single-walled carbon nanotube purification method of separating single-walled carbon nanotubes into metal type single-walled carbon nanotubes and semiconductor type single-walled carbon nanotubes in a laminated body constituted by the first porous structure 11, the holding part 13 and the second porous structure 12, and then, collecting only the single-walled carbon nanotubes having a targeted property.

Second Embodiment (Nanocarbon Separation Device)

Figure 7:
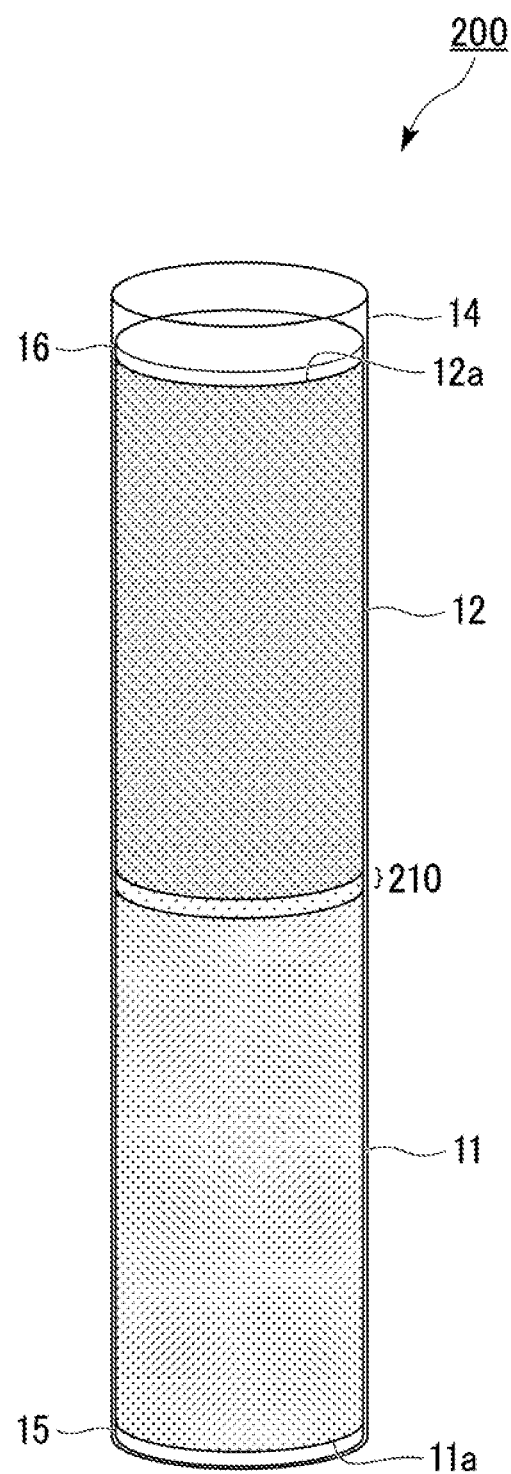
FIG. 7 is a schematic diagram showing a nanocarbon separation device of a second embodiment.

FIG. 7 is a schematic diagram showing a nanocarbon separation device of an embodiment. Further, in FIG. 7, the same components as those of the nanocarbon separation device of the first embodiment shown in FIG. 1 are designated by the same reference numerals, and overlapping description thereof will be omitted.

A nanocarbon separation device 200 of the embodiment includes a first porous structure 11 configured to hold a solution containing a surfactant, a second porous structure 12 configured to hold a dispersion medium, a holding part 210, a separation tank 14, a first electrode 15, and a second electrode 16. The holding part 210 is provided between the first porous structure 11 and the second porous structure 12, and holds a nanocarbon dispersion liquid containing metal type nanocarbons, semiconductor type nanocarbons and a surfactant and having a smaller content of the surfactant that that of the solution containing the surfactant. The first porous structure 11, the holding part 210 and the second porous structure 12 are disposed in this order and accommodated in the separation tank 14. The first electrode 15 is provided to come in contact with a lower end 11a of the first porous structure 11. The second electrode 16 is provided to come in contact with an upper end 12a of the second porous structure 12. In addition, the nanocarbon separation device 10 of the embodiment may include a direct current power supply (not shown) configured to apply a direct current voltage between the first electrode 15 and the second electrode 16.

In the nanocarbon separation device 200 of the embodiment, the holding part 210 is constituted by spaces between the first porous structure 11 and the second porous structure 12 in the separation tank 14.

A thickness of the holding part 210, i.e., a distance between the first porous structure 11 and the second porous structure 12 in the separation tank 14 is not particularly limited. The thickness of the holding part 210 is appropriately adjusted according to an amount of the nanocarbon dispersion liquid held in the holding part 210.

In the nanocarbon separation device 200 of the embodiment, while the case in which the first electrode 15 is the positive electrode and the second electrode 16 is the negative electrode has been exemplified, the nanocarbon separation device 200 of the embodiment is not particularly limited. In the nanocarbon separation device 200 of the embodiment, the first electrode 15 may be a negative electrode and the second electrode 16 may be a positive electrode.

According to the nanocarbon separation device 200 of the embodiment, the first porous structure 11 configured to hold the solution containing the surfactant, the second porous structure 12 configured to hold the dispersion medium, and the holding part 13 are provided between the first electrode 15 and the second electrode 16 in the separation tank 14. The holding part 13 holds the nanocarbon dispersion liquid containing the metal type nanocarbons, the semiconductor type nanocarbons and the surfactant and having a smaller content of the surfactant than that of the solution containing the surfactant. Accordingly, for example, in a nanocarbon separation method, which will be described below, a time for introducing the liquid into the separation tank 14 can be greatly reduced.

(Nanocarbon Separation Method)

An action of the nanocarbon separation device 200 will be described while describing the nanocarbon separation method using the nanocarbon separation device 200 with reference to FIGS. 7 to 11. Further, in FIGS. 7 to 10, the same components as those of the nanocarbon separation device of the first embodiment shown in FIGS. 1 and 2 and the nanocarbon separation method of the first embodiment shown in FIGS. 3 to 5 are designated by the same reference numerals, and overlapping description thereof will be omitted.

The nanocarbon separation method of the embodiment has a disposition process, a contact process and a separation process. In the disposition process, the first porous structure 11 in which the solution containing the surfactant is held, the holding part 210 in which the single-walled carbon nanotube dispersion liquid is held, and the second porous structure 12 in which the dispersion medium is held are disposed in this order in the separation tank 14. In the contact process, the first electrode 15 comes in contact with at least part of the lower end 11a of the first porous structure 11, and the second electrode 16 comes in contact with at least part of the upper end 12a of the second porous structure 12. In the separation process, a direct current voltage is applied to between the first electrode 15 and the second electrode 16, and the metal type single-walled carbon nanotubes and the semiconductor type single-walled carbon nanotubes are separated by moving the metal type nanocarbon contained in the single-walled carbon nanotube dispersion liquid toward the second electrode 16 while moving the semiconductor type nanocarbons contained in the single-walled carbon nanotube dispersion liquid toward the first electrode 15.

In addition, the nanocarbon separation method of the embodiment may have a process of collecting the metal type nanocarbons and the semiconductor type nanocarbons contained in the nanocarbon dispersion liquid after the separation process (hereinafter, referred to as "a collecting process").

First, like the first embodiment, the solution containing the surfactant and the single-walled carbon nanotube dispersion liquid are prepared.

Next, like the first embodiment, the solution containing the surfactant is held in the first porous structure 11.

In addition, the dispersion medium is held in the second porous structure 12.

Figure 8:
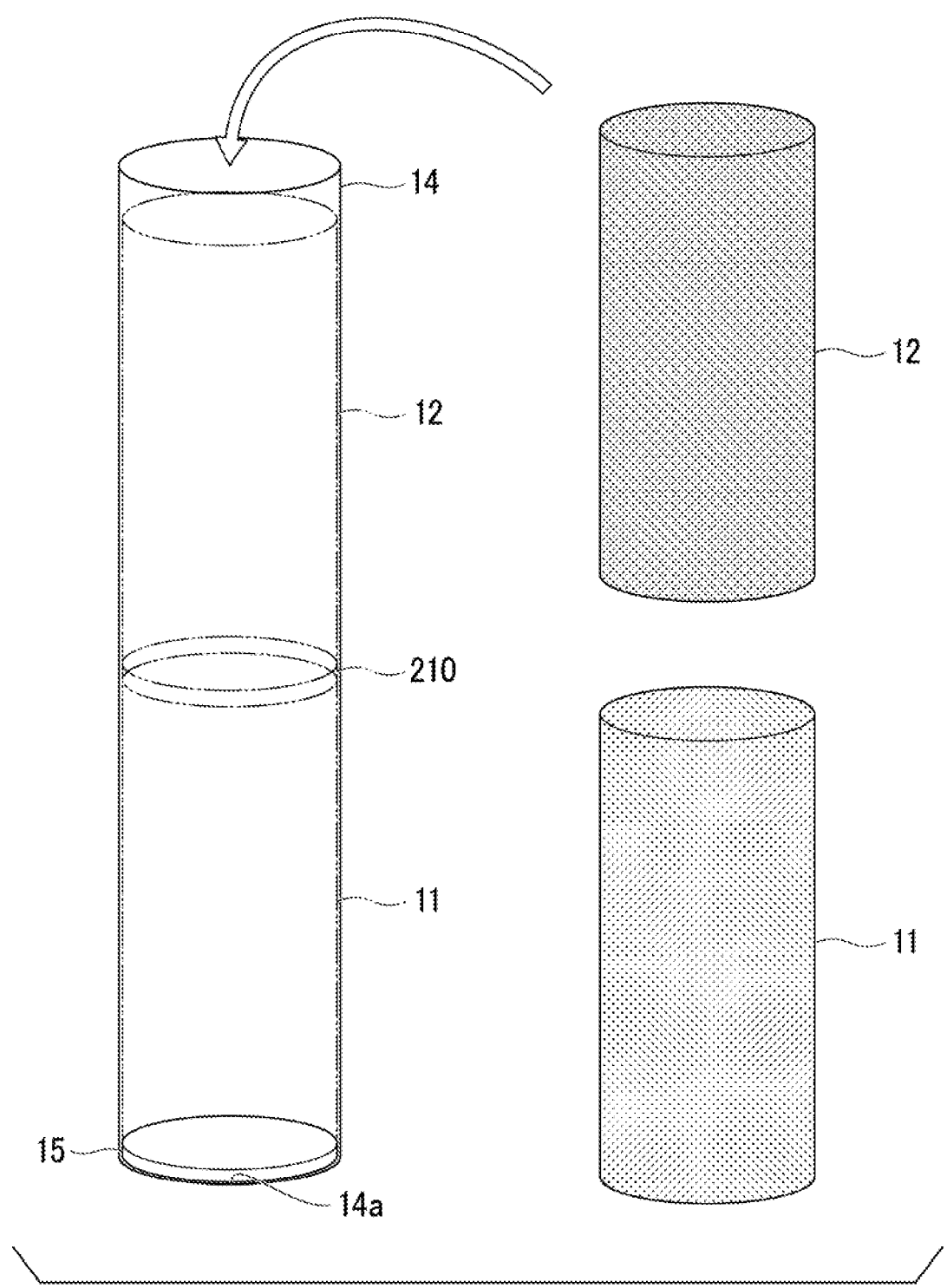
FIG. 8 is a schematic diagram showing a nanocarbon separation method of the second embodiment.
Figure 11:
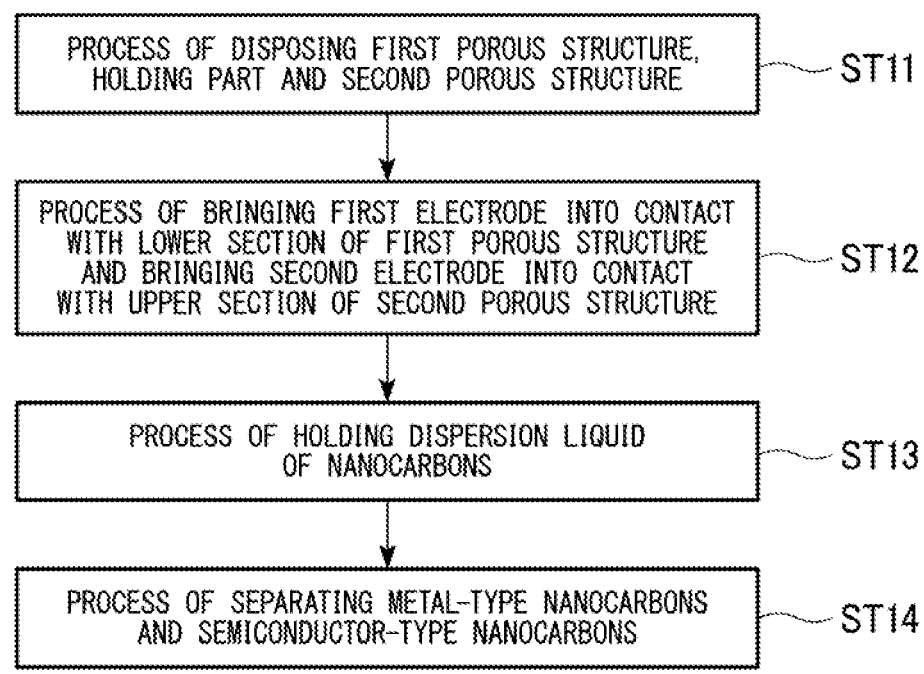
FIG. 11 is a flowchart showing the nanocarbon separation method of the second embodiment.

Next, in the disposition process, as shown in FIG. 8, a process of disposing the first porous structure 11 in which the solution containing the surfactant is held and the second porous structure 12 in which the dispersion medium is held in this order in the separation tank 14 is performed (ST11 in FIG. 11).

In the disposition process, the first porous structure 11 and the second porous structure 12 are disposed to be spaced apart from each other in a height direction of the separation tank 14 such that the holding part 210 constituted by the spaces between the first porous structure 11 and the second porous structure 12 is formed in the separation tank 14.

In the disposition process, the first electrode 15 is preferably provided on the lower surface 14a in the separation tank 14.

In addition, in the disposition process, the first porous structure 11, the holding part 210 and the second porous structure 12 may be disposed in this order in the separation tank 14, and the lower end 11a of the first porous structure 11 does not need to be in contact with the first electrode 15.

Next, in the contact process, for example, as shown in FIG. 7, a process of bringing the first electrode 15 into contact with at least part of the lower end 11a of the first porous structure 11 and bringing the second electrode 16 into contact with at least part of the upper end 12a of the second porous structure 12 is performed (ST12 in FIG. 11).

Next, in the holding part 210, for example, the single-walled carbon nanotube dispersion liquid is injected using a syringe or the like. Then, some of the single-walled carbon nanotube dispersion liquid infiltrates into and held in the first porous structure 11 and the second porous structure 12 (ST13 in FIG. 11).

Figure 9:
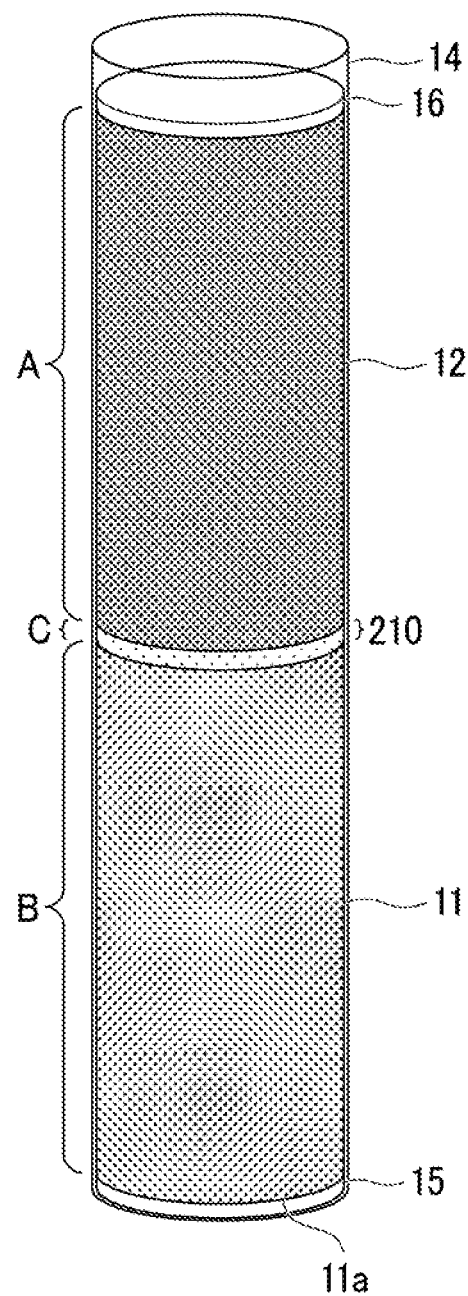
FIG. 9 is a schematic diagram showing the nanocarbon separation method of the second embodiment.

Next, like the first embodiment, the separation process is performed. In the separation process, as shown in FIG. 9, a process of moving the metal type single-walled carbon nanotubes contained in the nanocarbon dispersion liquid toward the second electrode 16 while moving the semiconductor type single-walled carbon nanotubes contained in the single-walled carbon nanotube dispersion liquid held in the holding part 210, the first porous structure 11 and the second porous structure 12 toward the first electrode 15 is performed through the electrophoresis. Accordingly, the metal type single-walled carbon nanotubes and the semiconductor type single-walled carbon nanotubes are separated (ST14 in FIG. 11).

When a direct current voltage is applied to the first electrode 15 and the second electrode 16, like the first embodiment, as shown in FIG. 9, the dispersion liquid is separated into three phases of the dispersion liquid phase A, the dispersion liquid phase B and the dispersion liquid phase C. The dispersion liquid phase A is a dispersion liquid phase having a relatively large content of the metal type single-walled carbon nanotubes. The dispersion liquid phase B is a dispersion liquid phase having a relatively large content of the semiconductor type single-walled carbon nanotubes. The dispersion liquid phase C is a dispersion liquid phase formed between the dispersion liquid phase A and the dispersion liquid phase B and having a relatively small content of the metal type single-walled carbon nanotubes and the semiconductor type single-walled carbon nanotubes.

After the separation process is terminated, in the collecting process, a process of collecting the metal type single-walled carbon nanotubes and the semiconductor type single-walled carbon nanotubes contained in the single-walled carbon nanotube dispersion liquid is performed. That is, the separated dispersion liquid phase B is collected (preparatively isolated) from the first porous structure 11 and the separated dispersion liquid phase A is collected (preparatively isolated) from the second porous structure 12.

Figure 10:
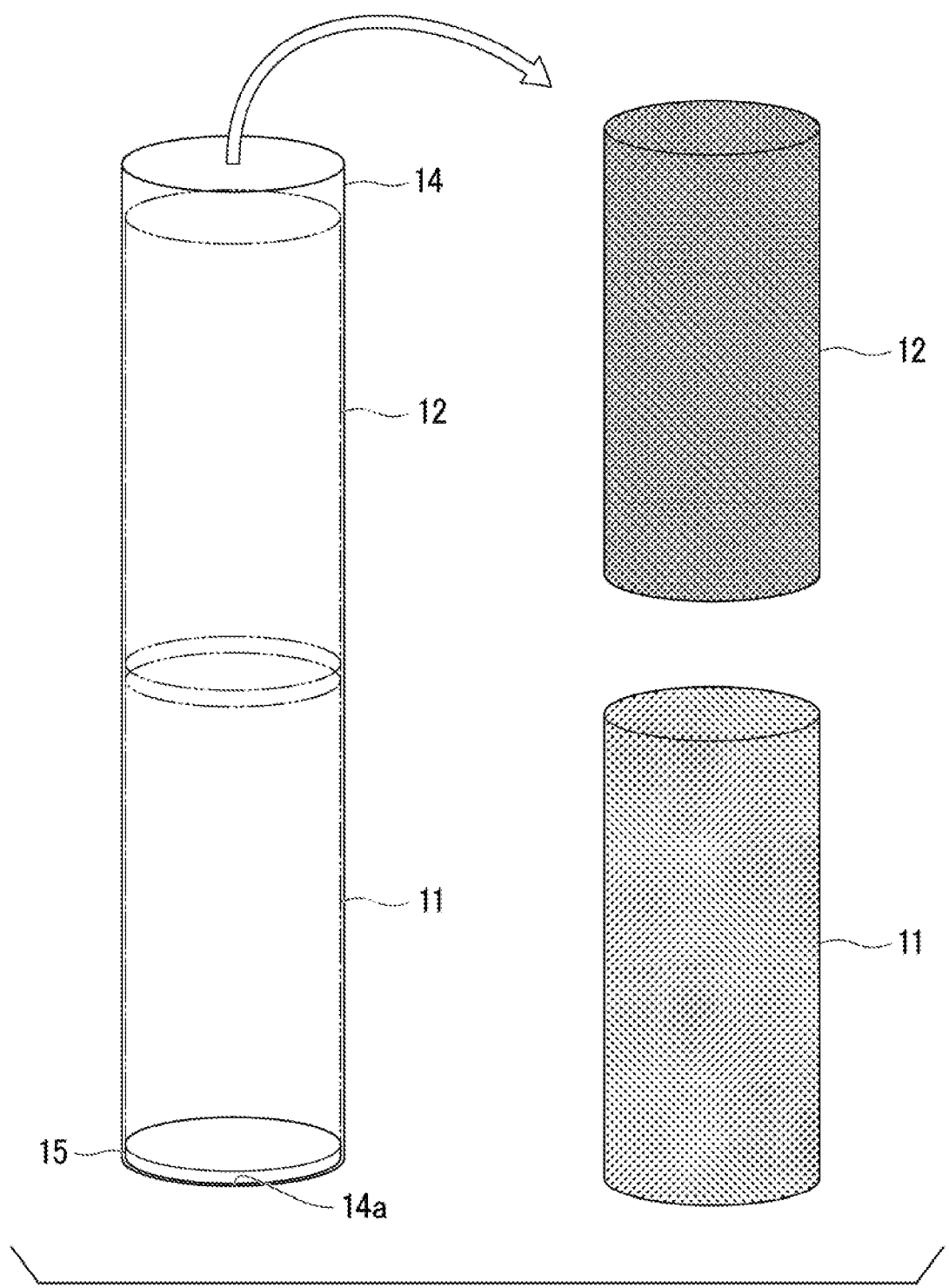
FIG. 10 is a schematic diagram showing the nanocarbon separation method of the second embodiment.

In the nanocarbon separation method of the embodiment, the next method is exemplified as the collecting method of collecting the dispersion liquid phase A and the dispersion liquid phase B. For example, as shown in FIG. 10, there is a method of collecting the first porous structure 11I containing the dispersion liquid phase B and the second porous structure 12 containing the dispersion liquid phase A from the separation tank 14, collecting (preparatively isolating) the semiconductor type single-walled carbon nanotubes from the first porous structure 11, and collecting (preparatively isolating) the metal type single-walled carbon nanotubes from the second porous structure 12.

In addition, like the first embodiment, the collected dispersion liquid is held in the holding part 210 again, and an operation of separating the metal type single-walled carbon nanotubes and the semiconductor type single-walled carbon nanotubes contained in the single-walled carbon nanotube dispersion liquid through the electrophoresis is repeatedly performed.

Separation efficiency of the collected dispersion liquid can be estimated like the first embodiment.

According to the nanocarbon separation method using the nanocarbon separation device 200 of the embodiment, the first porous structure 11 in which the solution containing the surfactant is previously held and the second porous structure 12 in which the dispersion medium is previously held are accommodated in the separation tank 14, and then, the single-walled carbon nanotube dispersion liquid is held in the holding part 210. Then, the metal type nanocarbons and the semiconductor type nanocarbons contained in the single-walled carbon nanotube dispersion liquid are separated. For this reason, a time for introducing the liquid into the separation tank 14 is greatly reduced, and as a result, the metal type nanocarbons and the semiconductor type nanocarbons can be rapidly and efficiently separated.

In addition, according to the nanocarbon separation method using the nanocarbon separation device 200 of the embodiment, after the separating operation of the metal type single-walled carbon nanotubes and the semiconductor type single-walled carbon nanotubes is terminated, the next operation is realized. That is, the separated semiconductor type single-walled carbon nanotubes can be efficiently collected from the first porous structure 11 and the separated metal type single-walled carbon nanotubes can be efficiently collected from the second porous structure 12.

Further, in the nanocarbon separation method of the embodiment, the case in which the mixture of the single-walled carbon nanotubes is separated into the metal type single-walled carbon nanotubes and the semiconductor type single-walled carbon nanotube has been exemplified. However, the nanocarbon separation method of the embodiment is not limited thereto. The nanocarbon separation method of the embodiment may also be performed as a single-walled carbon nanotube purification method of separating the single-walled carbon nanotubes into the metal type single-walled carbon nanotubes and the semiconductor type single-walled carbon nanotubes in the laminated body constituted by the first porous structure 11, the holding part 210 and the second porous structure 12, and then, collecting only the single-walled carbon nanotubes having a targeted property.

REFERENCE SIGNS LIST 10, 100, 200 Nanocarbon separation device
11 First porous structure
12 Second porous structure
13, 210 Holding part
14 Separation tank
15 First electrode
16 Second electrode

The invention claimed is:

1. A nanocarbon separation device comprising:
a first porous structure configured to hold a solution containing a surfactant;
a second porous structure configured to hold a dispersion medium;
a holding part provided between the first porous structure and the second porous structure and configured to hold the dispersion liquid containing the nanocarbons and the surfactant and having a smaller content of the surfactant than that of the solution;
a separation tank in which the first porous structure, the holding part and the second porous structure are disposed and accommodated in an order of the first porous structure, the holding part and the second porous structure;
a first electrode provided on a lower section of the first porous structure; and
a second electrode provided on an upper section of the second porous structure.

2. The nanocarbon separation device according to claim 1, wherein the first porous structure and the second porous structure are constituted by sponge.

3. The nanocarbon separation device according to claim 1, wherein the holding part is constituted by a third porous structure.

4. The nanocarbon separation device according to claim 3, wherein at least one of the first porous structure, the second porous structure and the third porous structure is constituted by a plurality of region disposed in a thickness direction.

5. The nanocarbon separation device according to claim 1, wherein at least one of the first porous structure and the second porous structure is constituted by a plurality of regions disposed in a thickness direction.

6. The nanocarbon separation device according to claim 1, wherein the first electrode is provided on any one of an outward side and an inward side of the first porous structure, and the second electrode is provided on any one of an outward side and an inward side of the second porous structure.

7. A nanocarbon separation method comprising:
disposing a first porous structure in which a solution containing a surfactant is held, a holding part in which a dispersion liquid containing nanocarbons and the surfactant and having a smaller content of the surfactant than that of the solution is held, and a second porous structure in which the dispersion medium is held, in an order of the first porous structure, the holding part and the second porous structure;
bringing a first electrode into contact with a lower section of the first porous structure and bringing a second electrode into contact with an upper section of the second porous structure; and
applying a direct current voltage between the first electrode and the second electrode.

8. The nanocarbon separation method according to claim 7, wherein, in the process of applying, metal type nanocarbons and semiconductor type nanocarbons are separated by moving the metal type nanocarbon contained in the dispersion liquid toward the second electrode while moving the semiconductor type nanocarbons contained in the dispersion liquid toward the first electrode.

9. The nanocarbon separation method according to claim 7, comprising, after the process of applying, collecting metal type nanocarbons or semiconductor type nanocarbons contained in the dispersion liquid is provided.

10. A nanocarbon separation method comprising:
disposing a first porous structure in which a solution containing a surfactant is held, a holding part in which a dispersion liquid containing nanocarbons and the surfactant and having a smaller content of the surfactant than that of the solution is held, and a second porous structure in which the dispersion medium is held, in an order of the first porous structure, the holding part and the second porous structure;
bringing a first electrode into contact with a lower section of the first porous structure and bringing a second electrode into contact with an upper section of the second porous structure;
holding the dispersion liquid in the holding part; and
applying a direct current voltage between the first electrode and the second electrode.

11. The nanocarbon separation method according to claim 10, wherein, in the process of applying, metal type nanocarbons and semiconductor type nanocarbons are separated by moving the metal type nanocarbon contained in the dispersion liquid toward the second electrode while moving the semiconductor type nanocarbons contained in the dispersion liquid toward the first electrode.

12. The nanocarbon separation method according to claim 10, comprising, after the process of applying, collecting metal type nanocarbons or semiconductor type nanocarbons contained in the dispersion liquid is provided.

* * * * *